United States Patent
Nagaya et al.

(10) Patent No.: US 11,198,472 B2
(45) Date of Patent: Dec. 14, 2021

(54) VEHICLE LOWER-PART STRUCTURE

(71) Applicant: Toyota Jidosha Kabushiki Kaisha, Toyota (JP)

(72) Inventors: Satoru Nagaya, Toyota (JP); Yoshimi Toda, Toyota (JP); Yozo Ikeda, Toyota (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/906,527

(22) Filed: Jun. 19, 2020

(65) Prior Publication Data
US 2020/0406973 A1 Dec. 31, 2020

(30) Foreign Application Priority Data
Jun. 28, 2019 (JP) .............................. JP2019-121187

(51) Int. Cl.
| | | |
|---|---|---|
| B62D 21/03 | (2006.01) | |
| B62D 21/09 | (2006.01) | |
| B62D 25/02 | (2006.01) | |
| B62D 25/20 | (2006.01) | |
| B60R 16/04 | (2006.01) | |
| B62D 21/11 | (2006.01) | |
| B60K 1/04 | (2019.01) | |
| B60R 11/00 | (2006.01) | |
| B62D 47/02 | (2006.01) | |

(52) U.S. Cl.
CPC .............. *B62D 21/03* (2013.01); *B60K 1/04* (2013.01); *B60R 16/04* (2013.01); *B62D 21/09* (2013.01); *B62D 21/11* (2013.01); *B62D 25/025* (2013.01); *B62D 25/2036* (2013.01); *B60K 2001/0438* (2013.01); *B60R 2011/004* (2013.01); *B62D 47/02* (2013.01)

(58) Field of Classification Search
CPC .......................... B60K 1/04; B60K 2001/0438
USPC ....... 280/791, 795–798, 784, 790, 107, 783; 296/209, 204, 29, 30, 35.1
See application file for complete search history.

(56) References Cited

U.S. PATENT DOCUMENTS

| | | | |
|---|---|---|---|
| 6,227,322 B1 * | 5/2001 | Nishikawa ........... | B62D 29/008 180/68.5 |
| 7,665,768 B2 * | 2/2010 | Duval .................. | B62D 63/061 280/789 |
| 7,950,728 B2 * | 5/2011 | Plavetich .................. | B60R 9/00 296/193.01 |
| 2015/0217707 A1 | 8/2015 | Tanigaki et al. | |

FOREIGN PATENT DOCUMENTS

| | | | | |
|---|---|---|---|---|
| WO | WO2007/065318 | * | 6/2007 | ........... B60H 1/3233 |
| WO | 2014034377 A1 | | 3/2014 | |

* cited by examiner

*Primary Examiner* — Dennis H Redder
(74) *Attorney, Agent, or Firm* — Dinsmore & Shohl LLP

(57) ABSTRACT

Provided is a vehicle lower-part structure including a pair of center side members arranged under a floor of a vehicle; a first cross member and a second cross member connecting the pair of center side members; a main battery arranged in an underfloor space; one or more support plates arranged at a corner of the underfloor space; and a water tank placed on the support plate, in which the support plate is connected to both the center side member and the first or second cross member and connects the two.

7 Claims, 11 Drawing Sheets

VEHICLE LOWER-PART STRUCTURE

CROSS REFERENCE TO RELATED APPLICATION

This application claims priority to Japanese Patent Application No. 2019-121187 filed on Jun. 28, 2019, which is incorporated herein by reference in its entirety including the specification, claims, drawings, and abstract.

TECHNICAL FIELD

The present specification discloses a vehicle lower-part structure in which a main battery and on-vehicle devices are arranged under a floor of a vehicle.

BACKGROUND

Conventionally, an electric vehicle that is drive by a driving motor with power supplied from a main battery has been widely known. A main battery mounted on such an electric vehicle is often relatively large. Various techniques have conventionally been proposed for the arrangement of such a large main battery. As one such technique, a technique of arranging a flat main battery under a floor of a vehicle interior is known. For example, WO 2014/034377 A proposes a configuration of suspending and holding a main battery by a frame member provided at a lower part of a vehicle. The frame member includes a pair of side members extending in the vehicle front-rear direction, and a plurality of cross members connecting the pair of side members. In WO 2014/034377 A, a battery pack (main battery) is fastened to the bottom surfaces of the side members and the cross members, and the battery pack is located below the side members and the cross members. According to the technique of WO 2014/034377 A, a space under the floor of the vehicle can be effectively utilized to some extent.

However, in the technique of Patent WO 2014/034377 A, only the battery pack is arranged under the floor of the vehicle, and the space adjacent to the battery pack is a dead space. Further, in WO 2014/034377 A, it is difficult to sufficiently lower the arrangement height of the side members and the cross members, because the battery pack is located below the side members and the cross members. As a result, the technique of WO 2014/034377 A has insufficiently reduced the floor height of the vehicle interior.

Therefore, the present specification discloses a vehicle lower-part structure that can more effectively utilize a space under a floor and can further reduce a floor height.

SUMMARY

According to the disclosure of the present specification, there is provided a vehicle lower-part structure including: a pair of center side members extending in a vehicle front-rear direction under a floor of a vehicle; a first cross member extending in a vehicle width direction and connecting the pair of center side members; a second cross member extending in the vehicle width direction on a rear side in the vehicle front-rear direction with respect to the first cross member and connecting the pair of center side members; a main battery that is arranged in an underfloor space surrounded by the pair of center side members, the first cross member, and the second cross member, and supplies power to a power unit; one or more support members arranged at a corner of the underfloor space; and an on-vehicle device placed on the support member, in which the support member is connected to both the center side member and the first or second cross member, and connects the two.

With this configuration, while distortion of a frame can be effectively prevented, the dead space under the vehicle floor can be effectively utilized. As a result, the floor height can be further reduced.

In this case, the on-vehicle device may be a liquid tank that stores a liquid. Further, the on-vehicle device may be a water tank that stores water used in an on-vehicle air conditioner.

By arranging the liquid tank or the water tank, which tends to be heavy, under the floor, the center of gravity of the vehicle is lowered, and the vehicle is stabilized. Further, the liquid tank and the water tank have a low possibility of failure due to flooding. Therefore, even when the device is arranged under the floor, complicated waterproof measures are not required, and the device can be easily arranged under the floor.

Further, the on-vehicle device may be an air tank that stores air used in an air suspension.

Further, the air tank has a low possibility of failure due to flooding. Therefore, even when the device is arranged under the floor, complicated waterproof measures are not required, and the device can be easily arranged under the floor.

Further, the on-vehicle device may be an auxiliary battery that supplies power to a vehicle auxiliary device.

By arranging the auxiliary battery, which tends to be heavy, under the floor, the center of gravity of the vehicle is lowered, and the vehicle is stabilized. In this case, since the auxiliary battery can be arranged near the main battery, the electrical wiring between the two can be shortened.

Further, the vehicle may be provided with a door only on one side surface in the vehicle width direction, and the on-vehicle device may be arranged only at a corner of the underfloor space on a side opposite to a door in the vehicle width direction, and is not necessarily arranged at a corner on the same side as the door in the vehicle width direction.

By arranging the on-vehicle device only on the side opposite to the door, it is possible to reduce the shaking of the vehicle caused by an occupant getting on and off.

The support members may be provided at all four corners of the underfloor space, and the on-vehicle device may be placed on each of the four support members.

With this configuration, the dead space under the vehicle floor can be more effectively utilized.

According to the vehicle lower-part structure disclosed in present specification, the space under the floor can be more effectively utilized, and the floor height can be further reduced.

BRIEF DESCRIPTION OF DRAWINGS

Embodiment(s) of the present disclosure will be described based on the following figures, wherein.

DESCRIPTION OF EMBODIMENTS

Embodiments

Figure 1:
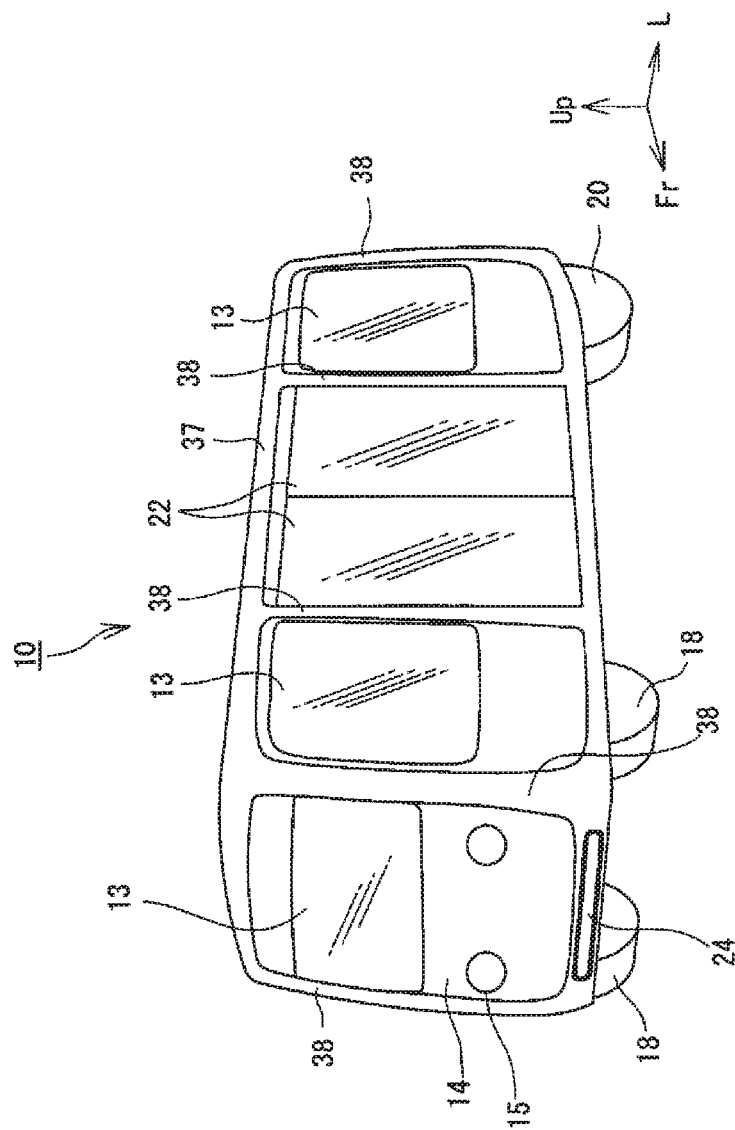
FIG. 1 is a perspective view of a vehicle as viewed from the outside.

Hereinafter, the configuration of a vehicle 10 will be described with reference to the drawings. In the drawings referred to below, "Fr", "Up", and "L" indicate the front of the vehicle, the upside of the vehicle, and the left side in the vehicle width direction, respectively.

Figure 2:
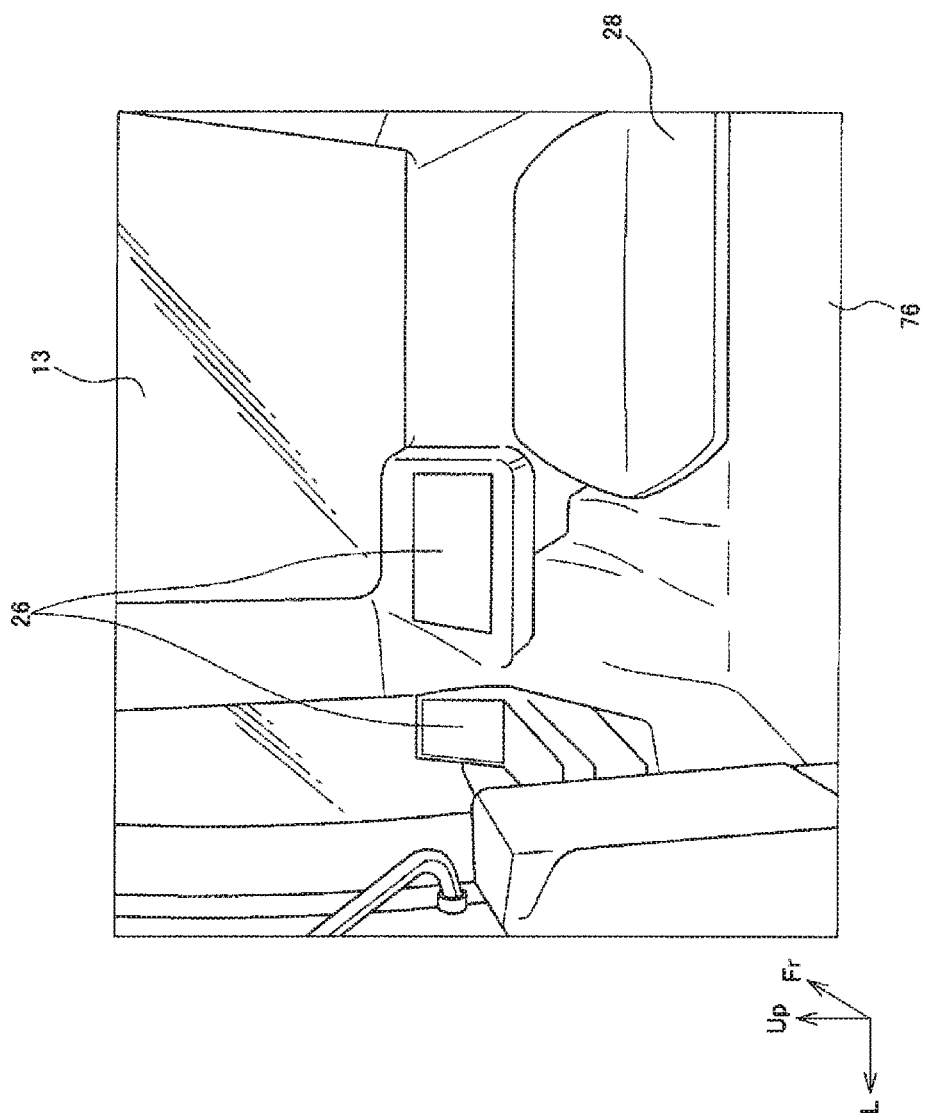
FIG. 2 is a perspective view of a vehicle interior when the front of the vehicle is viewed from the center of the vehicle.
Figure 3:
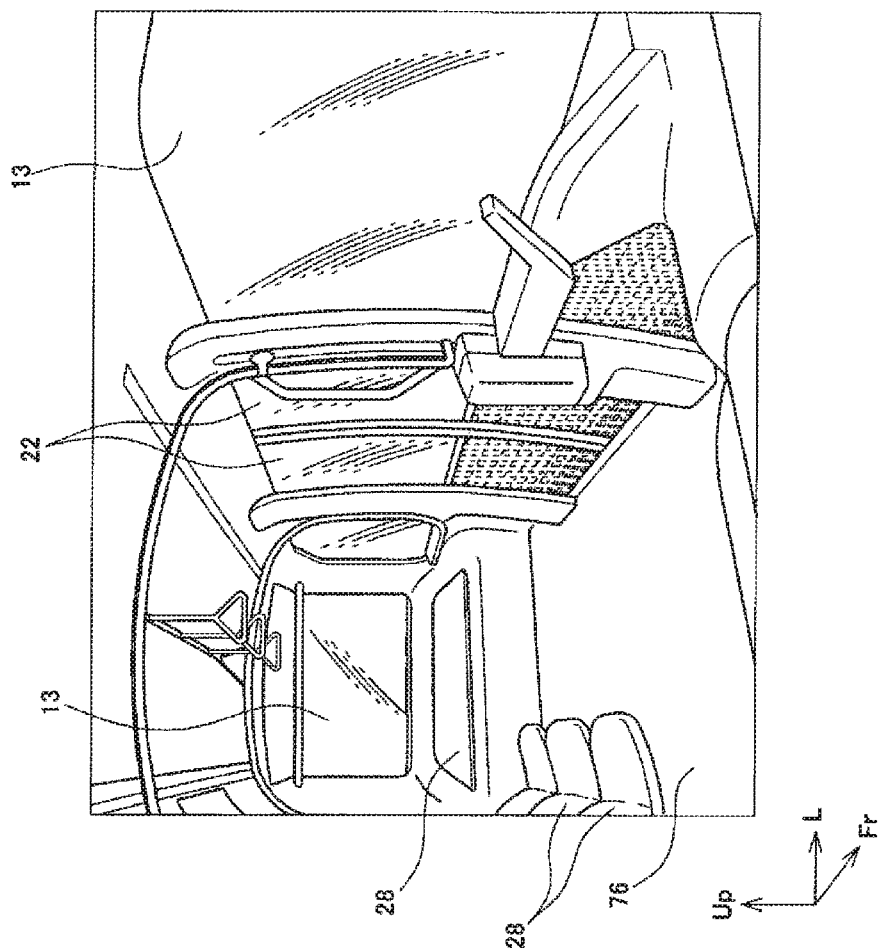
FIG. 3 is a perspective view of the vehicle interior when the rear of the vehicle is viewed from the front of the vehicle.
Figure 4:
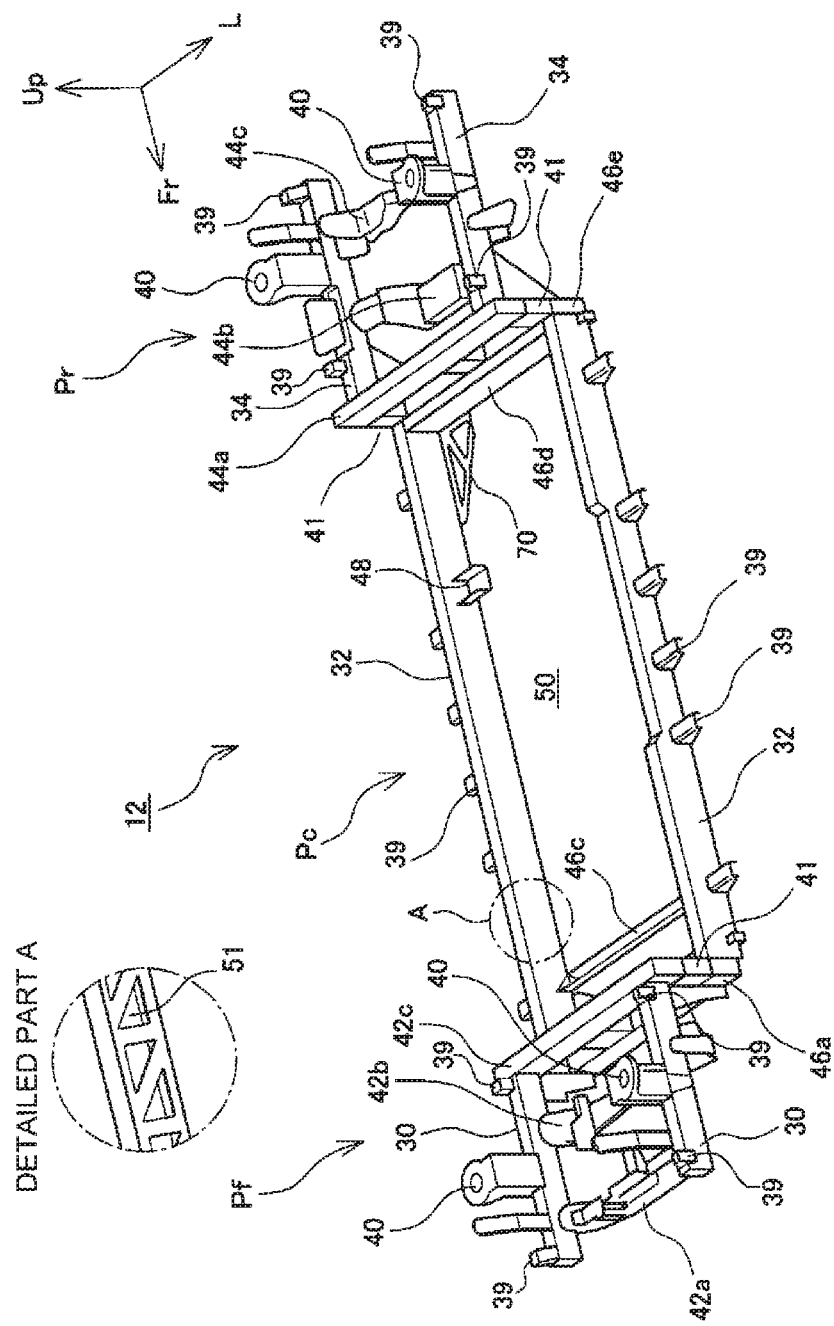
FIG. 4 is a perspective view of a main frame of the vehicle as viewed from the side.
Figure 5:
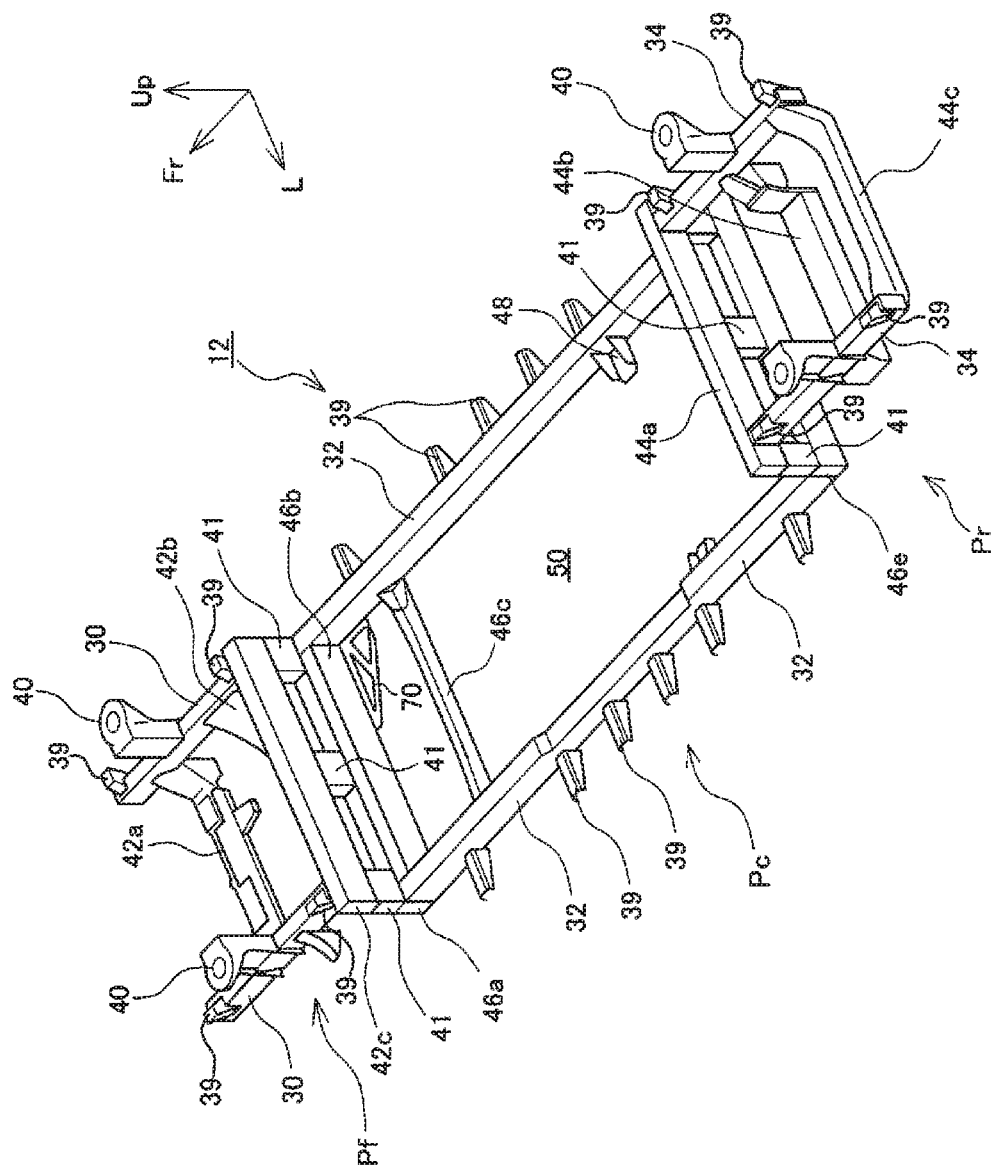
FIG. 5 is a perspective view of the main frame of the vehicle as viewed from the rear.

First, an overall configuration of the vehicle 10 will be briefly described with reference to FIGS. 1 to 5. FIG. 1 is a perspective view of the vehicle 10 as viewed from the outside. FIG. 2 is a perspective view of the vehicle interior when the front of the vehicle is viewed from the center of the vehicle, and FIG. 3 is a perspective view of the vehicle interior when the rear of the vehicle is viewed from the front of the vehicle. FIGS. 4 and 5 are perspective views of a main frame 12 of the vehicle 10.

The vehicle 10 is used as a bus for transporting passengers while traveling in a specific site along a prescribed route by automatic driving. However, the usage form of the vehicle 10 disclosed in present specification can be changed as appropriate, and for example, the vehicle 10 may be used as a movable business space. For example, the vehicle 10 may be used as a store such as a retail store that displays and sells various products and a restaurant that cooks and provides food. Alternatively, as another form, the vehicle 10 may be used as an office for performing office work, meetings with customers, and the like. Further, the vehicle 10 may be used as a taxi, a bus, or a transportation vehicle for transporting customers and luggage. Further, the usage scene of the vehicle 10 is not limited to business, and for example, the vehicle 10 may be used as personal transportation. Further, the traveling pattern and traveling speed of the vehicle 10 may be changed as appropriate.

The vehicle 10 is an electric vehicle including a driving motor as a prime mover, and the vehicle 10 is equipped with a main battery 54 (see FIG. 6) for supplying power to the driving motor. As shown in FIG. 1, the vehicle 10 does not have a hood and a trunk, and has a substantially rectangular outer shape in which a front end surface and a rear end surface stand substantially vertically. A pair of front wheels 18 are provided in the vicinity of the front end of the vehicle 10, and a pair of rear wheels 20 are provided in the vicinity of the rear end. A large window 13 is provided on a side surface of the vehicle 10. Further, a double-sided sliding type door 22 that slides in the front-rear direction of the vehicle and opens and closes is provided at the center of the left side surface of the vehicle 10.

On a front end surface of the vehicle 10, there are provided a window 13 functioning as a windshield, and a lamp arrangement portion 14 arranged below the window portion. In the lamp arrangement portion 14, there is arranged a signal lamp 15 for notifying an outsider, by light, of the presence and behavior of the vehicle. A grill 24 for guiding outside air into the vehicle is provided at a lower end of the lamp arrangement portion 14. The rear end surface of the vehicle 10 has substantially the same configuration as the front end surface of the vehicle. The window 13 and the lamp arrangement portion 14 are arranged vertically, and the grill 24 is arranged at the lower end of the lamp arrangement portion 14. Accordingly, the vehicle 10 of the present example has a substantially symmetrical appearance in the front-rear direction.

As shown in FIG. 2, operation panels 26 for receiving instructions from an operator are provided at the front of the vehicle interior of the vehicle 10. Further, the vicinity of a front end of a floor panel 76 is raised upward, and forms seats 28 on which an occupant can sit facing rearward of the vehicle. Similarly, as shown in FIG. 3, the vicinity of a rear end of the floor panel 76 is raised so as to form seats 28 on which an occupant can sit facing forward of the vehicle. Large interior parts such as seats are not fixedly installed around the door 22 in the vehicle interior, and a wider space is secured.

The vehicle 10 of the present example has a body-on-frame structure in which a box-shaped body is assembled on a ladder-shaped main frame 12. As shown in FIGS. 4 and 5, the main frame 12 is roughly divided into a front part Pf located between the pair of front wheels 18, a rear part Pr located between the pair of rear wheels 20, and a center part Pc located between the front part Pf and the rear part Pr. In the front part Pf, there are provided a pair of front side members 30 extending in the vehicle front-rear direction, and three front cross members 42a, 42b, and 42c connecting the pair of front side members 30. The front cross member 42c connects the rear ends of the two front side members 30 to each other. A suspension tower 40 for mounting an air suspension (not shown) stands from the upper surface of each of the front side members 30.

Similarly to the case of the front part Pf, in the rear part Pr, there are provided a pair of rear side members 34 extending in the vehicle front-rear direction, and rear cross members 44a, 44b, and 44c connecting the pair of rear side members 34. The rear cross member 44a connects the front ends of the two rear side members 34 to each other. A suspension tower 40 for mounting an air suspension (not shown) stands from the upper surface of each of the rear side members 34.

In the center part Pc, there are provided a pair of center side members 32 extending in the vehicle front-rear direction, and a plurality of center cross members 46a, 46b, 46c, 46d, and 46e connecting the pair of center side members 32. The center cross member 46a connects the front ends of the pair of center side members 32, and the center cross member 46e connects the rear ends of the pair of center side members 32. Further, the center cross member 46b is provided adjacent to the rear of the center cross member 46a, and the center cross member 46d is provided adjacent to the front of the center cross member 46e. In other words, at the front end and the rear end of the center part Pc, the two center cross members 46 extending in the vehicle width direction are arranged to be stacked in the front-rear direction. Thereby, distortion of the center part Pc is more effectively prevented.

Here, as is apparent from FIGS. 4 and 5, the center part Pc has a rectangular space surrounded by the pair of center side members 32, the center cross member 46b, and the center cross member 46d. Hereinafter, this space is referred to as "underfloor space 50". The center cross member 46b located at the front end of the underfloor space 50 is referred to as a "first cross member 46b", the center cross member 46d located at the rear end of the underfloor space 50 is referred to as a "second cross member 46d", and the center cross member 46c located between the first cross member 46b and the second cross member 46d is referred to as a "support cross member 46c".

The center part Pc is located below the front part Pf and the rear part Pr. Therefore, a plurality of kick members 41 that extend vertically and connect the front cross member 42c and the center cross member 46a are provided at the boundary between the center part Pc and the front part Pf. Similarly, a plurality of kick members 41 that extend vertically and connect the center cross member 46e and the rear cross member 44a are provided at the boundary between the center part Pc and the rear part Pr.

The cross members and the side members except the support cross member 46c are square pipe-shaped members having a rectangular cross section. In FIGS. 4 and 5, all the side members and the cross members are shown in a simplified manner, but these are all provided with through holes 51 (triangular holes in the illustrated example) on side surfaces thereof as shown in the detailed part A in FIG. 4. By forming such through holes 51, the weight of the main frame 12 can be significantly reduced. In addition, by forming the through holes 51, a part of the wirings and the pipes can be passed through the inside of the square pipe-shaped side member or cross member through the through holes 51.

A prime mover, a power transmission device, a brake device, a traveling device, a suspension device, a steering device, an electric device, and the like are assembled to the main frame 12 as described above, and a chassis is configured. Here, as described above, the front (part corresponding to the center part Pc) and the rear (part corresponding to the rear part Pr) of the floor panel 76 are raised upward. Most of the above-described prime mover and various devices are arranged in a space below the raised part of the floor panel 76.

A box-shaped body is assembled on the main frame 12. In order to assemble the body, a plurality of cab mount brackets 39 are fixed to the side members 30, 32, and 34 at intervals in the vehicle front-rear direction. The cab mount brackets 39 are brackets to which the body is connected, and protrude outward from the outer surfaces of the center side members 32 in the vehicle width direction. As shown in FIG. 1, the body includes, for example, pillars 38 extending in the vehicle up-down direction, and rails 37 extending in the front-rear direction at the boundary between the side surfaces and the top surface of the vehicle 10.

Figure 6:
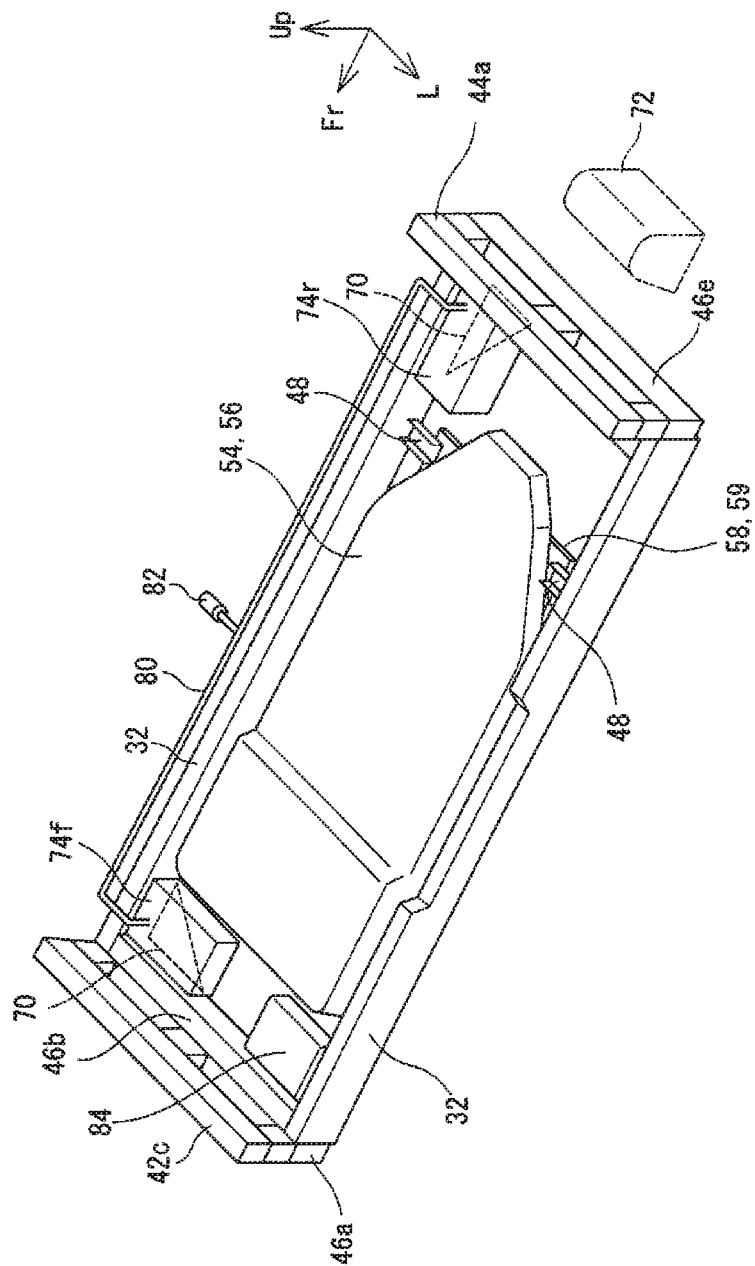
FIG. 6 is a schematic perspective view around an underfloor space.
Figure 7:
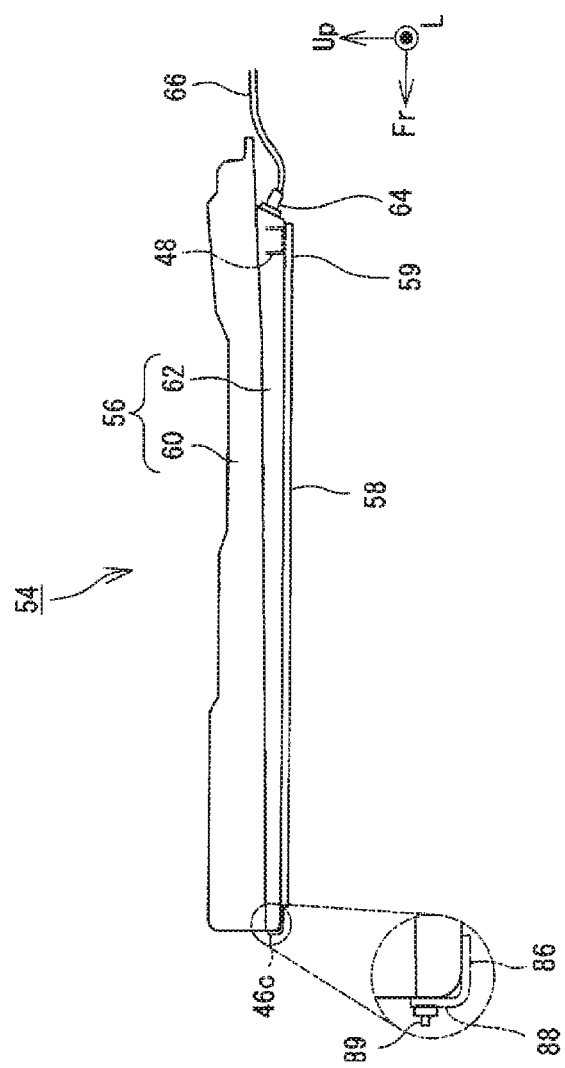
FIG. 7 is a side view of a main battery.
Figure 8:
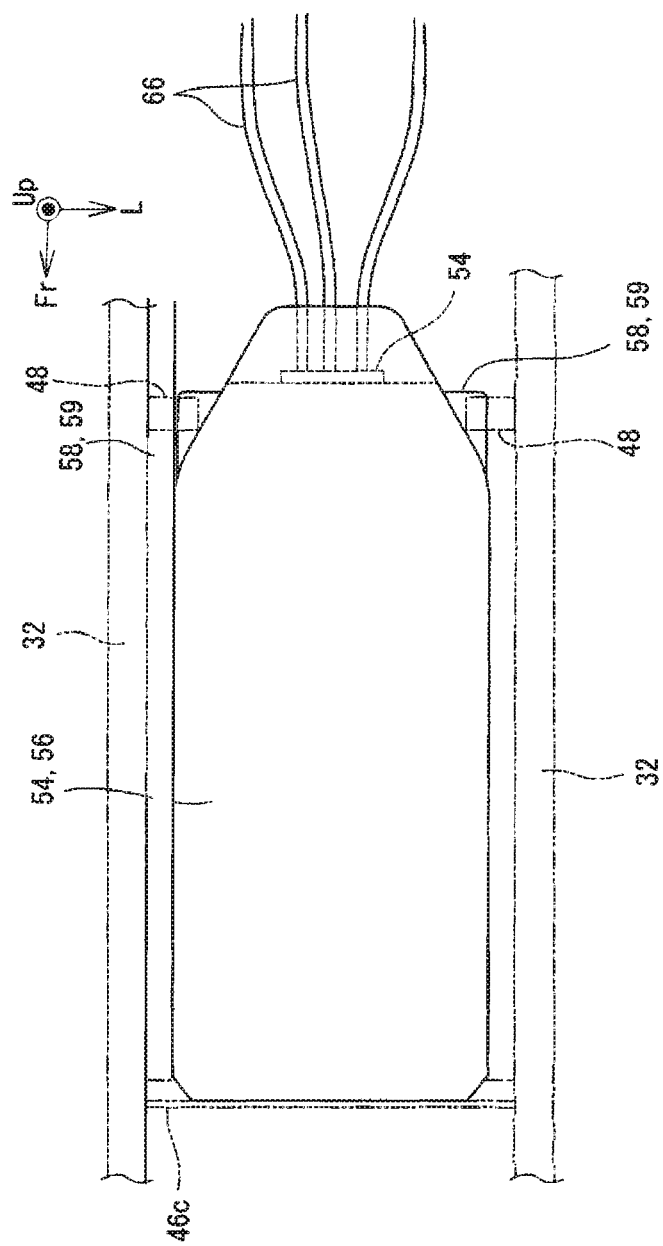
FIG. 8 is a plan view of the main battery.

Next, the arrangement of components in the underfloor space 50 will be described. FIG. 6 is a schematic perspective view around the underfloor space 50. FIG. 7 is a side view of the main battery 54, and FIG. 8 is a plan view of the main battery 54. In the present example, as shown in FIG. 6, the main battery 54 and water tanks 74f and 74r are arranged in the underfloor space 50.

The main battery 54 supplies power to a power unit 72 including the driving motor. The main battery 54 is a secondary battery capable of charging and discharging power, and supplies power to the power unit 72 and can be charged with external power or power regenerated by the vehicle 10. The main battery 54 includes a battery case 56 in which a battery main body is housed, and a battery frame 58 fixed to the bottom surface of the battery case 56.

The battery case 56 is a case in which the main components of the main battery 54 are housed, and the battery case 56 and housed objects serve as a main body portion of the main battery 54. The battery case 56 has a flat shape that is long in the vehicle front-rear direction, and corners on both sides in the vehicle width direction at the rear end are greatly cut off diagonally. Therefore, the battery case 56 has a substantially hexagonal shape that is long and narrow in the vehicle front-rear direction in plan view. The battery case 56 is roughly divided into a lower case 62, and an upper case 60 that covers the upper part of the lower case 62. As is apparent from FIG. 7, the rear end of the lower case 62 is located forward of the rear end of the upper case 60, and a terminal portion 64 is provided on the rear end surface of the lower case 62. From this terminal portion 64, a cable 66 for electrically connecting the main battery 54 and the power unit 72 is drawn out. The cable 66 extends to the rear of the vehicle and is connected to the power unit 72 arranged at the rear of the vehicle.

The battery frame 58 is a flat member that covers the bottom surface of the battery case 56. The rear corner of the battery frame 58 projects outward in the vehicle width direction from the corner cut portions of the battery case 56 in plan view, and is exposed to the outside when the main battery 54 is viewed from above. Hereinafter, portions of the battery frame 58 that project outward from the battery case 56 in the vehicle width direction are referred to as "projecting portions 59". As is apparent from the figure, the upper surfaces of the projecting portions 59 are lower than the upper surface of the battery case 56.

The thickness (height dimension) of the main battery 54 is substantially the same as or slightly smaller than the height dimension of the center side members 32. In the present example, in order to support the main battery 54, the support cross member 46c and support brackets 48 are provided.

As described above, the support cross member 46c is a cross member that is arranged to be apart from the first cross member 46b toward the rear of the vehicle, and supports the front end of the main battery 54 from below. As shown in FIG. 7, the support cross member 46c is an angle material having an L shaped cross section in which a placing portion 86 on which the main battery 54 is placed and a standing portion 88 that stands vertically from the front end of the placing portion 86 are connected. A plurality of fastening holes are formed in the standing portion 88 at intervals in the vehicle width direction, and fastening bolts 89 protruding from the battery case 56 are inserted through the fastening holes. Then, by fastening the fastening bolts 89 with nuts, the front end of the main battery 54 is connected to and supported by the support cross member 46c. With such a configuration of the support cross member 46c, the strength of the entire support cross member 46c can be improved while suppressing the thickness of the placing portion 86. Since the thickness of the placing portion 86 is reduced, the height of the upper surface of the main battery 54 can be reduced. As a result, the floor height of the vehicle interior arranged above the center side members 32 can be reduced, and the floor surface height of the vehicle 10 can be further reduced. Further, since the entire support cross member 46c has an L shaped cross section, it is unlikely to bend, and the front end of the main battery 54 can be stably supported.

The support brackets 48 are brackets arranged behind the support cross member 46c; that is, at positions that are closer to the power unit 72 than is the support cross member 46c. As is apparent from FIGS. 4 to 6, the support brackets 48 protrude from the inner side surface in the vehicle width direction of each of the pair of center side members 32 toward the center in the vehicle width direction. Each support bracket 48 has a substantially U-shaped cross-sectional shape in a plane orthogonal to the vehicle width direction, which is open upward. The support bracket 48 is fastened to an upper surface of the projecting portion 59 projecting outward from the battery case 56. As a result, the vicinity of the rear end of the main battery 54 is suspended and held by the support brackets 48.

Here, as is apparent from the above description, in the present example, the vicinity of the rear end of the main battery 54 is suspended and held by the support brackets 48 that do not cross the underfloor space 50. The reason for this configuration will be described with reference to FIG. 11.

Figure 11:
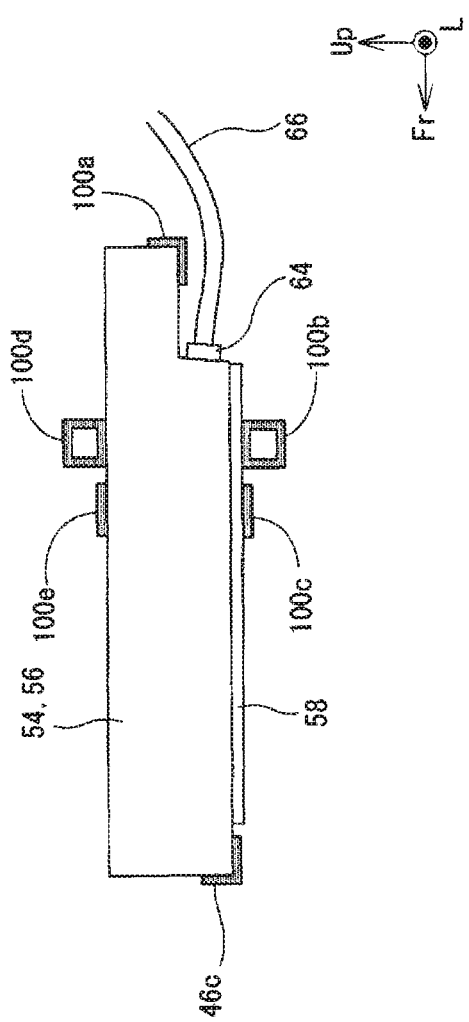
FIG. 11 is a side view showing an example in which a rear end of the main battery is supported by cross members.

FIG. 11 is a schematic side view of the main battery 54, for showing an example in which the rear end of the main battery 54 is supported by cross members. As cross members for supporting the rear end of the main battery 54, there are conceivable five types of cross members 100a to 100e shown in FIG. 11.

The cross member 100a is a cross member having an L-shaped cross section similar to the support cross member 46c, and supports the rear end of the main battery 54. When such a cross member 100a is used, the cable 66 drawn out rearward in the vehicle from the rear end of the lower case 62 easily interferes with the cross member, and it becomes difficult to route the cable 66.

Therefore, it is conceivable to provide a cross member at a position forward of the terminal portion 64 in the vehicle, instead of in the vicinity of the rear end of the main battery 54. For example, it is conceivable to provide, like the cross member 100b or the cross member 100c in FIG. 11, a cross member that supports the main battery 54 from below at a position forward of the terminal portion 64 in the vehicle. With such a configuration, interference between the cross member and the cable 66 can be prevented. However, when a thick member such as the cross member 100b is arranged below the main battery 54, the height of arrangement of the main battery 54 is increased accordingly, and thus the height under the vehicle floor is increased. As a result, reduction in the floor height of the vehicle is hindered. Such a problem can be alleviated by using a flat cross member such as the cross member 100c. However, such a flat cross member 100c easily bends, and thus cannot stably hold the main battery 54.

Further, in a case where a cross member is arranged below the main battery 54 as in the case of the cross members 100b and 100c, when the main battery 54 is to be removed from the lower side of the vehicle for maintenance, the cross members 100b and 100c interfere with the removed main battery 54, which hinders the removal operation.

Therefore, it is conceivable to provide a cross member above the main battery 54 as shown by the cross members 100d and 100e. With such a configuration, the main battery 54 can move downward without interfering with the cross members 100d and 100e, and thus can be easily removed. However, in this case, if the thick cross member 100d is used, the floor surface height of the vehicle is increased accordingly, and if the thin cross member 100e is used, the main battery 54 cannot be stably held.

On the other hand, in the present example, the pair of support brackets 48 supports the vicinity of the rear end of the main battery 54. Since the support brackets 48 do not cross the underfloor space 50 in the vehicle width direction, interference with the cable 66 is prevented, and the cable 66 is easily routed. Further, the support brackets 48 are fastened to the upper surface of the projecting portions 59, and are not located below the main battery 54. Thereby, the maintainability of the main battery 54 can be improved. That is, according to the present example, if the cable 66 is removed from the main battery 54 and the fastening between the support brackets 48 and the battery frame 58 and the fastening between the support cross member 46c and the battery frame 58 are released, thereafter, merely by pulling the main battery 54 obliquely rearward and downward, the main battery 54 can be easily removed from the vehicle 10.

Further, in the present example, the main battery 54 is provided with the projecting portions 59 whose upper surface height is lower than that of the main body portion (battery case 56), and the support brackets 48 are fastened to the upper surfaces of the projecting portions 59. Therefore, even if the support brackets 48 have a thick shape, the support brackets 48 do not protrude significantly from the upper surface of the battery case 56. As a result, the height under the vehicle floor can be kept low. Further, by forming the cross sections of the support brackets 48 into a non-linear shape (in the present example, U-shape), the bending of the support brackets 48 can be effectively prevented, and the main battery 54 can be stably held.

FIG. 6 is referred to again. In the underfloor space 50, the front water tank 74f and the rear water tank 74r (hereinafter, referred to as "water tank 74" when the front and rear sides are not distinguished) are also arranged. The water tank 74 is one of the components of an air conditioner (not shown). The air conditioner mounted on the vehicle 10 of the present embodiment cools refrigerant with outside air in a condenser during cooling, similarly to a normal air conditioner. In the present example, mist is sprayed to the vicinity of the condenser to improve the cooling efficiency of the refrigerant.

Latent heat when the sprayed mist (water) evaporates cools the outside air around the condenser, so that the refrigerant is more efficiently cooled. The water tank 74 is a tank that stores water used for the mist spraying and water condensed by an evaporator.

The air conditioner of the present example includes a front air conditioning unit for air conditioning the front of the vehicle interior, and a rear air conditioning unit for air conditioning the rear of the vehicle interior. The front air conditioning unit includes the front water tank 74f, and the rear air conditioning unit includes the rear water tank 74r.

The water tank 74 stores condensed water generated in the air conditioner and water supplied from the outside as water for mist spraying. That is, each air conditioning unit includes an evaporator for exchanging heat with air in the vehicle interior. During cooling, the evaporator is cooled by gaseous refrigerant jetted from an expansion valve. When warm air in the vehicle interior contacts the cold evaporator, moisture contained in air in the vehicle interior is condensed. A hose (not shown) for guiding this condensed water to the water tank 74 is connected between the evaporator and the water tank 74. Water that is insufficient with only the condensed water is supplied from the outside. A water supply hose 80 (see FIG. 6) for receiving the water supply from the outside is connected to the water tank 74. The water supply hose 80 extends in the front-rear direction from the water tank 74 along the center side member 32 on the right side and is connected to a water supply port 82 near the center of the vehicle.

Figure 9:
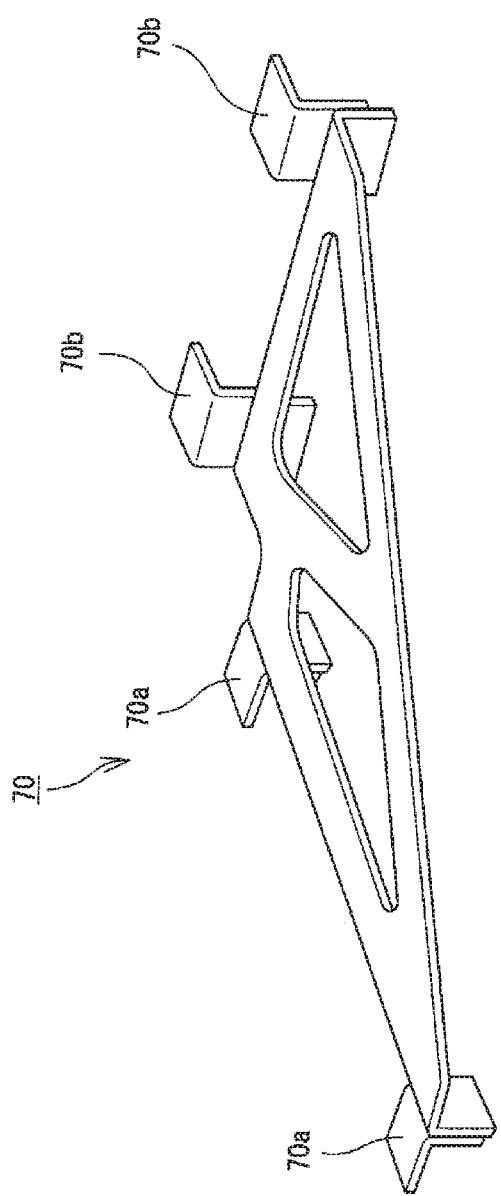
FIG. 9 is a perspective view of a support plate.

In order to support the water tanks 74, in the present example, support plates 70 having a substantially triangular shape in a plan view are provided. FIG. 9 is a perspective view of the support plate 70. The support plate 70 is a support member that supports an on-vehicle device such as the water tank 74, and is arranged at a corner of the underfloor space 50. The support plate 70 is a sheet metal member that connects the center side member 32, and the first cross member 46b or the second cross member 46d. On one side of the support plate 70, two first connection portions 70a connecting the support plate 70 and the bottom surface of the center side member 32 are provided. The upper surface of the first connection portion 70a is welded to the bottom surface of the center side member 32. On the other side of the support plate 70, two second connection portions 70b connecting the support plate 70, and the first cross member 46b or the second cross member 46d are provided. The upper surface of the second connecting portion 70b is welded to the bottom surface of the first cross member 46b or the second cross member 46d.

The water tank 74 is placed and fixed on the support plate 70. Thus, by providing the support plates 70 that connect the center side members 32 and the cross members 46b and 46d, distortion of the main frame 12 is more effectively prevented, and the strength of the main frame 12 is more reliably ensured. In addition, the dead space of the underfloor space 50 can be effectively utilized by disposing the water tanks 74 on the support plates 70 arranged at the corners of the underfloor space 50. By effectively utilizing the dead space, the thickness under the floor can be reduced, and the floor height can be further reduced. Here, the front end of the rear water tank 74r is located forward of the rear end of the main battery 54, and the two overlap in the front-back direction. However, in the present example, since the rear corners of the main battery 54 are greatly cut off diagonally, spaces of a certain size can be secured in the rear corners of the underfloor space 50. As a result, the rear water tank 74r can be arranged without causing interference with the main battery 54.

Here, each of the two water tanks 74 is provided on the right side of the vehicle; that is, on the side opposite to the door 22. The water tank 74 is relatively heavy due to the storage of water. However, by providing the water tanks 74 on the side opposite to the door 22, the shaking of the vehicle 10 caused by an occupant getting on and off is effectively suppressed, and the vehicle 10 can be further improved in stability. Further, by disposing the two water tanks 74 on the right side of the vehicle 10; in other words, by arranging the two water tanks 74 in a line in the vehicle front-rear direction, the path of the water supply hose 80 extending from the two water tanks 74 to the water supply port 82 can be simplified.

As shown in FIG. 6, in the underfloor space 50, an air tank 84 that stores air used in an air suspension (not shown) is further arranged. The air tank 84 stores high-pressure air supplied to an air spring of the air suspension or low-pressure air for collecting air from the air spring of the air suspension. The air tank 84 is arranged at the left front corner of the underfloor space 50. Since the air tank 84 is lighter and easier to support than the water tank 74, in the present example, the end surface in the vehicle width direction of the air tank 84 and the rear end surface of the first cross member 46b are connected by a flat connecting member (not shown). With this configuration, the weight of the vehicle 10 can be reduced as compared with the case where a support plate 70 is provided for the air tank 84. However, as a matter of course, a support plate 70 may be provided at the right front corner to support the air tank 84.

Here, as is apparent from the above description, in the present example, at the corners of the underfloor space 50, the support plates 70 that connect the side member and the cross members are arranged, and the support plates 70 support the water tanks 74 which are a type of on-vehicle device. With this arrangement, distortion of the main frame 12 can be effectively suppressed, and the dead space under the floor can be effectively utilized. In particular, in the case of a liquid tank that stores a liquid, such as the water tank 74, the weight of the liquid tank tends to be large, and therefore it is required to hold the liquid tank firmly from below. By using the support plate 70, a heavy liquid tank can be stably held. However, it goes without saying that the on-vehicle device supported by the support plate 70 is not limited to the liquid tank, but may be another device.

For example, in the above-described example, the air tank 84 is connected to the first cross member 46b by the connecting member mounted to the end surface in the vehicle width direction. However, as shown in FIG. 9, a support plate 70 may be provided below the air tank 84 and at the right front corner of the underfloor space 50, and the support plate 70 may support the air tank 84. Neither the water tank 74 nor the air tank 84 is equipped with an electric device. Therefore, even if the water tank 74 and the air tank 84 are arranged under the floor where water can easily enter, they are unlikely to be damaged due to flooding. In addition, while both the water tank 74 and the air tank 84 are required to have a predetermined capacity, the shapes thereof can often be freely changed. Therefore, if the water tank 74 and the air tank 84 can be relatively freely changed in shape according to the shape of the dead space of the underfloor space 50, they can be easily arranged in the underfloor space 50.

Figure 10:
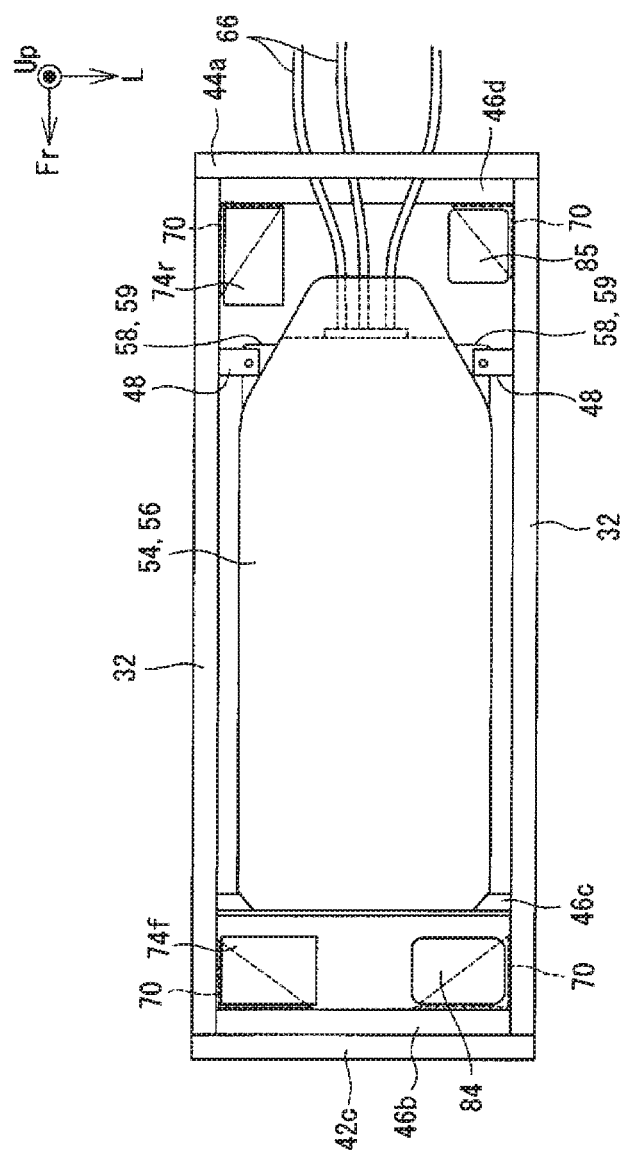
FIG. 10 is a plan view showing another example of a vehicle lower-part structure.

Further, even a vehicle-mounted component on which an electric device is mounted may be arranged in the underfloor space 50, so long as a sufficient waterproof structure is provided. For example, as shown in FIG. 10, the support plate 70 that connects the side member and the cross member is provided at a corner (left rear corner in the illustrated example) of the underfloor space 50, and an auxiliary battery 85 for supplying power to an auxiliary device may be arranged on the support plate 70.

The configuration described so far is merely an example, and may be changed as long as the configuration includes the main battery 54 arranged in the underfloor space 50, one or more support members (for example, the support plate 70) arranged at the corner of the underfloor space 50, and the on-vehicle device (for example, the water tank 74) placed on the support member, and the support member is connected to both the center side member 32 and the first or second cross members 46b or 46d and connects the two. Therefore, the type of the on-vehicle device placed on the support member may be appropriately changed. Further, the on-vehicle device may be fixed to the support member, or may be fixed to a member other than the support member, for example, the side member or the cross member. Further, the manner of supporting the main battery 54 is not limited to the above-described form, and may be changed. Furthermore, in the present example, a substantially box-shaped vehicle that is automatically driven at a low speed has been described as an example. However, the vehicle lower-part structure disclosed in the present example may be mounted on vehicles of other forms.

REFERENCE SIGNS LIST

10 Vehicle
12 main frame
13 window
14 lamp arrangement portion
15 signal lamp
18 front wheel
20 rear wheel
22 door
24 grill
26 operation panel
28 seat
30 front side member
32 center side member
34 rear side member 37 rail
38 pillar
39 cab mount bracket
40 suspension tower
41 kick member
42a to 42c front cross member
44a to 44c rear cross member
46a to 46e center cross member
46b first cross member
46c support cross member
46d second cross member
48 support bracket
50 underfloor space
54 main battery
56 battery case
58 battery frame
59 projecting portion
60 upper case
62 lower case
64 terminal portion
66 cable
70 support plate
72 power unit
74 water tank
76 floor panel
80 water supply hose
82 water supply port
84 air tank
85 auxiliary battery
86 placing portion
88 standing portion
89 fastening bolt
100a to 100e cross member
Pc center part
Pf front part
Pr rear part

The invention claimed is:

1. A vehicle lower-part structure comprising:
a pair of center side members extending in a vehicle front-rear direction under a floor of a vehicle;
a first cross member extending in a vehicle width direction and connecting the pair of center side members;
a second cross member extending in the vehicle width direction on a rear side in the vehicle front-rear direction with respect to the first cross member and connecting the pair of center side members;
a main battery that is arranged in an underfloor space surrounded by the pair of center side members, the first cross member, and the second cross member, and supplies power to a power unit;
one or more support members of a plate form arranged at a corner of the underfloor space; and
an on-vehicle device placed on each of the one or more support members, wherein
an upper part of each of the one or more support members is connected to both a first connection portion connected to a bottom surface of the center side member and a second connection portion connected to a bottom surface of the first or second cross member, and connects the two.

2. The vehicle lower-part structure according to claim 1, wherein
the on-vehicle device is a liquid tank storing a liquid.

3. The vehicle lower-part structure according to claim 2, wherein
the on-vehicle device is a water tank that stores water used in an on-vehicle air conditioner.

4. The vehicle lower-part structure according to claim 1, wherein
the on-vehicle device is an air tank that stores air used in an air suspension.

5. The vehicle lower-part structure according to claim 1, wherein
the on-vehicle device is an auxiliary battery that supplies power to a vehicle auxiliary device.

6. The vehicle lower-part structure according to claim 1, wherein
the vehicle is provided with a door only on one side surface in the vehicle width direction, and
the on-vehicle device is arranged only at a corner of the underfloor space on a side opposite to a door in the vehicle width direction, and is not arranged at a corner on the same side as the door in the vehicle width direction.

7. The vehicle lower-part structure according to claim 1, wherein
the one or more support members includes four support members which are provided at all four corners of the underfloor space, and
the on-vehicle device is placed on each of the four support members.

* * * * *